UNITED STATES PATENT OFFICE.

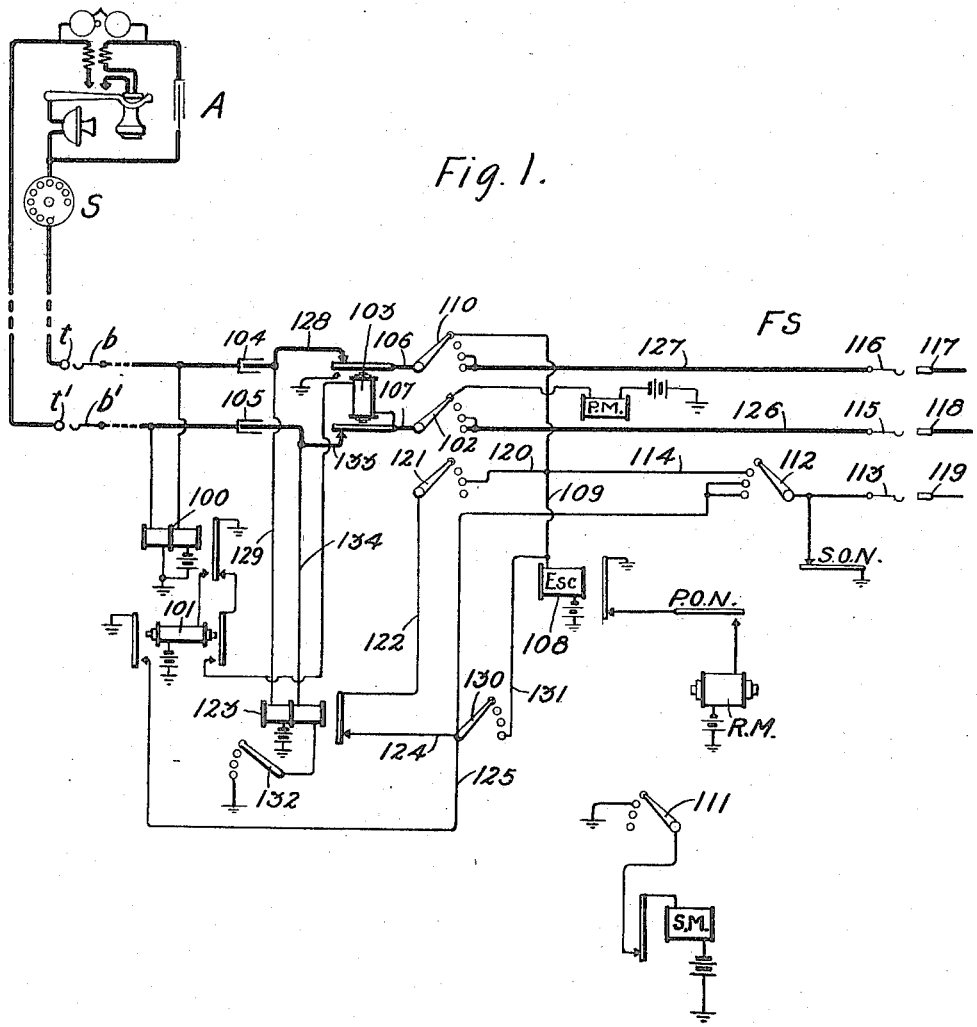

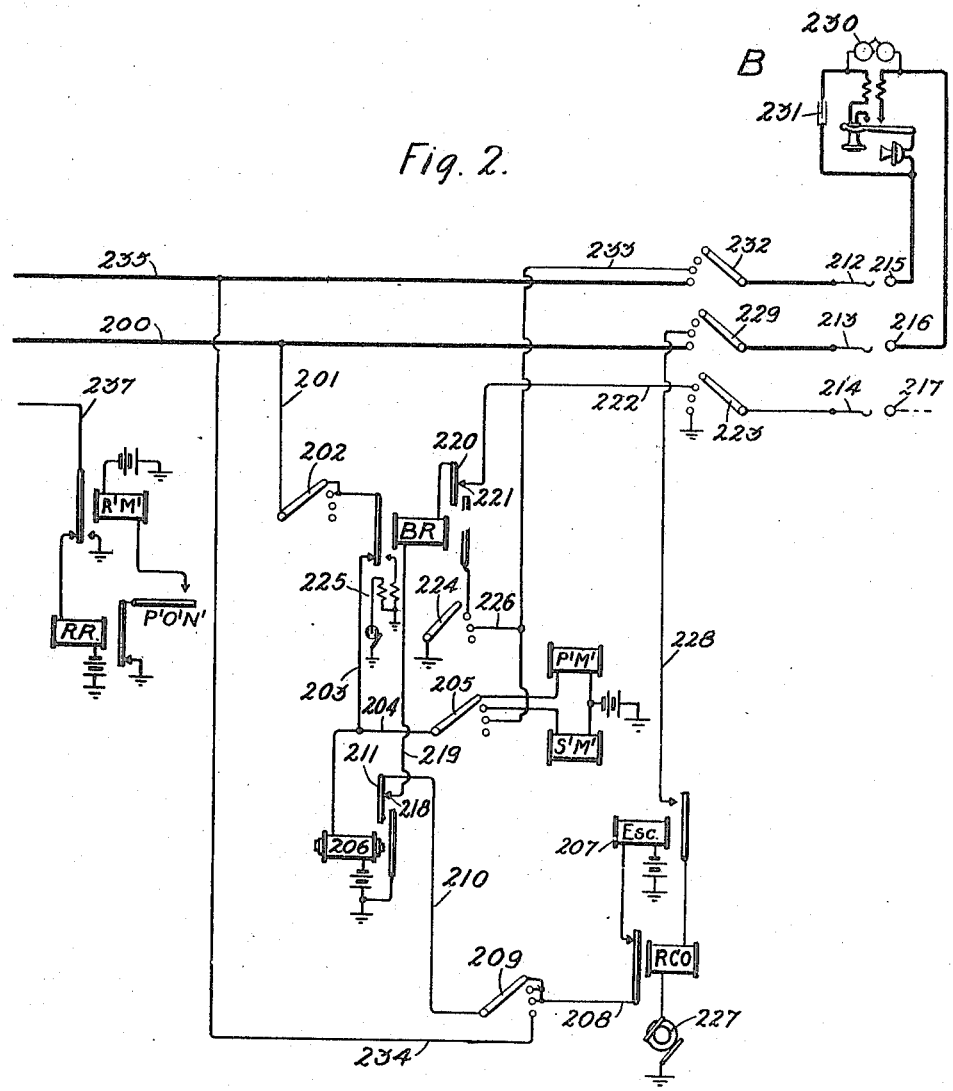

SAMUEL B. WILLIAMS, JR., OF BROOKLYN, NEW YORK, ASSIGNOR TO WESTERN ELECTRIC COMPANY, INCORPORATED, OF NEW YORK, N. Y., A CORPORATION OF NEW YORK.

MACHINE-SWITCHING TELEPHONE-EXCHANGE SYSTEM.

1,221,124.    Specification of Letters Patent.    Patented Apr. 3, 1917.

Application filed September 11, 1916. Serial No. 119,457.

*To all whom it may concern:*

Be it known that I, SAMUEL B. WILLIAMS, Jr., a citizen of the United States, residing at Brooklyn, in the county of Kings and State of New York, have invented certain new and useful Improvements in Machine-Switching Telephone-Exchange Systems, of which the following is a full, clear, concise, and exact description.

This invention relates to telephone exchange systems employing machine switching, and particularly to such systems wherein a set of repeating relays, located before the first selector, is employed to repeat impulses from the sender to the automatic switches involved in building up a connection.

Its object is to provide a simplified selector circuit for systems of this character, and the novelty consists in utilizing the escape magnet of the selector side switch to act also as the release relay. This is accomplished by making the release magnet slow to become sufficiently energized to withdraw the holding pawls from the selector brush shaft, and leading the circuit of such magnet over a back contact of the escape magnet, the circuit being so arranged that the escape magnet does not remain deënergized long enough during the changeover operations to permit the release magnet to become sufficiently magnetized to withdraw the holding pawls. However, upon the disestablishment or abandonment of the connection, the escape maknet remains permanently deënergized and the release magnet, after an interval, withdraws the holding pawls and restores the switch.

Referring to the drawings, Figures 1 and 2 taken together, illustrate so much of a telephone exchange system as is necessary for a comprehension of this invention.

Fig. 1 illustrates the finder and first selector circuit, and Fig. 2 the connector circuit.

The invention will be best understood from a detailed description of the operations involved in setting up a connection.

Upon the removal of the receiver at substation A, a finder, the brushes $b$, $b'$ and terminals $t$, $t'$ only of which are shown, is automatically set in motion in any well-known manner, and associates a first selector FS with the calling line. When the finder brushes $b$, $b'$ come to rest upon the terminals $t$, $t'$, the impulse relay 100 becomes energized over the line circuit, and in attracting its armature, energizes a slow relay 101. Relay 101, in attracting its right armature, connects the back contact of the stepping relay 100 to the primary magnet PM.

The subscriber at substation A now operates his sender S to transmit the first digit of the called number. This sender, in returning to its normal position, interrupts the circuit of stepping relay 100 a number of times, corresponding to the digit in question. Each time the relay 100 retracts its armature, an impulse is sent over the following path to the primary magnet PM of the first selector: free pole of battery, magnet PM, side-switch arm 102 and its first contact, slow relay 103, right armature and front contact of slow relay 101, armature and back contact of relay 100 to ground. Slow relay 103 becomes energized upon the first retraction of the armature of relay 100, and remains energized while the armature of relay 100 is vibrating. This relay, in attracting its armatures, disconnects the condensers 104, 105 from conductors 106, 107 to prevent the discharge of such condensers from interfering with the character of the impulses, and in attracting its upper armature, closes the following circuit for the escape magnet 108 of the side switch of the first selector FS: free pole of battery, magnet 108, conductor 109, side-switch arm 110 and its first contact, conductor 106, upper armature and front contact of relay 103 to ground. Escape magnet 108 is constructed to release the side switch from position to position, upon its deënergization, in the well-known manner. Consequently, when the sender S reaches its normal position and maintains the line circuit closed, the slow relay 103, after a slight interval, deënergizes and opens the circuit of escape magnet 108, which in deënergizing, releases the side switch into position 2. In position 2, side-switch arm 111 closes the circuit of the secondary magnet SM, and side-switch arm 112 connects the escape magnet 108 to the test brush 113 of the first selector. As side-switch arm 112 reaches its second contact the escapement magnet 108 is again pulled up over the following circuit: free pole of battery, magnet 108, conductors 109, 114, side-switch arm 112 and its second contact, secondary off-normal spring SON to ground. As the side-switch arm 111 reaches its second contact, the secondary magnet vibrates and steps the selector brushes 116, 115 and 113 over the multiples 117, 118, 119 of the selected group of trunks. The secondary off-normal spring SON opens on the first secondary step of the selector brush shaft, and the continued energization of the escape magnet 108 is dependent upon grounds on the test multiples 119 of busy trunks, as will be hereinafter described. When the test brush 113 reaches a non-grounded contact 119, the escape magnet becomes deënergized and passes the side switch into position 3. In position 3, the multiples 119 of the seized trunk are immediately grounded over side-switch arm 112, conductor 125 and the left armature and front contact of relay 101. In this position release relay RR of the connector is energized over the following circuit to open the circuit of release magnet R'M' of the connector: free pole of battery, relay RR, (Fig. 2) armature and back contact of release magnet R'M', conductor 237, terminal 119, brush 113, arm 112 and its third contact, conductor 125, left armature and front contact of relay 101 to ground. As soon as side-switch arm 121 engages its third contact, the escape magnet is immediately energized again over the following circuit: free pole of battery, escape magnet 108, conductors 109, 120, side-switch arm 121, conductor 122, armature and back contact of relay 123, conductors 124 and 125 to ground at the left armature and front contact of slow relay 101. Release magnet RM of the first selector is so constructed that it will not become sufficiently energized to withdraw the holding pawls from the selector brush shaft by the momentary closure of its circuit, as the escapement magnet deënergizes between positions 1 and 2 and 2 and 3 to advance the side switch. However, should the calling party abandon the call, the resultant deënergization of slow relay 101 would permanently deënergize the escape magnet, and the release magnet RM would become energized over the off-normal contact PON and withdraw the pawls from the brush shaft of the first selector, whereupon the selector would restore. When the brush shaft reaches its normal position, the primary off-normal contact PON, in opening, deënergizes the release magnet. The release magnet, in operating, restores the side-switch arms in the well-known manner.

Assume, however, that the calling party does not abandon the call, but transmits the next digit of the called number, in the present case the tens digit. It will be understood, however, that in actual practice a number of selectors would be interposed between the first selector and connector. As the sender S returns to its normal position it interrupts the line circuit a number of times, corresponding to the tens digit. Each time the relay 100 retracts its armature, an impulse is sent over the following path to the primary magnet P'M' of the connector: ground, armature and back contact of relay 100, armature and front contact of relay 101, slow relay 103, conductor 107, side-switch arm 102 and its third contact, conductor 126, brush 115, terminal 118, conductors 200, 201, side-switch arm 202 and its first contact, left armature and back contact of busy relay BR, conductors 203, 204, side-switch arm 205 and its first contact, primary magnet P'M', free pole of battery. In parallel with primary magnet P'M', a slow relay 206 is energized to control the escape magnet 207. Slow relay 206 attracts its armature upon the first impulse and closes the following circuit for the escape magnet 207 of the connector: free pole of battery, magnet 207, armature and back contact of ringing cut-off relay RCO, conductor 208, side-switch arm 209 and its first contact, conductor 210, spring 211 of relay 206, armature of relay 206 to ground. Relay 206 remains energized during the transmission of the tens impulses. An interval after the cessation of the impulses, relay 206 becomes deënergized and opens the circuit of escape magnet 207, which in deënergizing, releases the side switch into position 2, in the well-known manner. In position 2, side-switch arm 205 substitutes the secondary magnet S'M' in the stepping circuit for the primary magnet. The calling party now operates his sender S to transmit the units digit of the calling number. Each time the relay 100 deënergizes, an impulse is sent over a path the same as that previously traced up to the side-switch arm 205, from whence it passes to the secondary magnet S'M'. The connector brushes 212, 213, and 214 are thus stepped over the group of multiples 215, 216, 217 containing those of the wanted line. As before, the slow relay 206 becomes energized upon the first units impulse, and closes the circuit traced for the escape magnet 207. When the sender restores and maintains the stepping relay 100 energized, the slow relay 206, after an interval, becomes deënergized and opens the circuit of escape magnet 207. Magnet 207, in deënergizing, releases the side switch into position 3, in which the slow relay 206 is again energized over the following circuit: free pole of battery, relay 206, conductor 204, arm 205 and its third contact, conductor 226, side-switch arm 224 to ground. Relay 206, in attracting its armature, again energizes the escape magnet 207. Magnet 207 closes the ringing circuit as follows: free pole of ringing generator 227, ringing cut-off relay RCO, armature and front contact of magnet 207, conductor 228, side-switch arm 229 and its third contact, brush 213, terminal 216 through the bell 230 and condenser 231 at the called substation, terminal 215, brush 212, arm 232 and its third contact, conductors 233, 226, arm 224 to ground. The ringing cut-off relay RCO does not become energized when this circuit is closed. However, upon the removal of the receiver at the called substation, this relay becomes energized, and in attracting its armature, opens the circuit of escape magnet 207, which in deënergizing, passes the side switch to position 4. Arm 209 of the side switch reaches position 4 before slow relay 206 completely deënergizes after its circuit is opened, and an impulse is sent over the following path to relay 123: (Fig. 1) ground, armature and spring 211 of slow relay 206, conductor 210, arm 209 and its fourth contact, conductors 234, 235, terminal 117, brush 116, conductor 127, arm 110 and its third contact, conductor 106, upper armature and back contact of relay 103, conductors 128, 129, left winding of relay 123, free pole of battery. Relay 123, in attracting its armature, opens the circuit of escape magnet 108, whereupon the side switch passes to position 4 in which ground is maintained upon the test wire 237 to hold up the release relay RR and maintain the seized trunk busy. The escape magnet is, however, immediately reënergized as the side switch reaches position 4 over the following circuit: free pole of battery, magnet 108, conductor 131, arm 130 and its fourth contact, conductor 125, left armature and front contact of relay 101 to ground. The interval during which the armature of escape magnet 108 remains retracted in this instance also is not sufficient to permit the release magnet RM to withdraw the holding pawls from the first selector brush shaft. In position 4 side-switch arm 132 closes the following circuit to feed talking battery to the called party over the windings of relay 123: free pole of battery, left winding of relay 123, conductors 129, 128, upper armature and back contact of relay 103, arm 110 and its fourth contact, conductor 127, brush 116, terminal 117, conductor 235, arm 232 and its fourth contact, brush 212, terminal 215 through the telephonic apparatus at substation D, terminal 216, brush 213, arm 229 and its fourth contact, conductor 200, terminal 118, brush 115, conductor 126, arm 102, lower armature and back contact of relay 103, conductors 133, 134, right winding of relay 123, arm 132 and its fourth contact to ground.

Upon the replacement of the receiver by the calling party, relay 100 becomes deënergized, and opens the circuit of slow relay 101, which, after an interval, retracts its armatures. This relay, in retracting its left armature, opens the circuit of escape magnet 108, which permanently retracts its armature, whereupon the release magnet RM, after an interval, energizes over the primary off-normal contact PON and withdraws the holding pawls from the brush shaft of the first selector. When the selector brush shaft reaches its normal position, the primary off-normal contact PON opens and deënergizes the release magnet. The retraction of the left armature of relay 101 also opens the circuit of release relay RR, (Fig. 2) of the connector. This relay, in retracting its armature, closes the circuit of release magnet R'M' of the connector over primary off-normal contact P'O'N'. This release magnet, in energizing, withdraws the holding pawls from the brush shaft of the connector. When such shaft reaches its normal position, it opens primary off-normal contact P'O'N', thus deënergizing the release magnet R'M'. The release magnet R'M', in energizing, restores the side-switch arms of the connector side switch in the well-known manner.

If the selected line is busy, the multiple 217 thereof is grounded, and the following circuit is closed to hold the connector escape magnet 207 in the second position: free pole of battery, escape magnet 207, armature and back contact of relay RCO, side-switch arm 209 and its second contact, conductor 210, make-before-break contact 218, conductor 219, busy relay BR, spring 220 and contact 221 of relay BR, conductor 222, side-switch arm 223 and its second contact, test brush 214, test terminal 217 to ground. Relay BR, in attracting its right armature, locks itself to ground, over side-switch arm 224 and its second contact, independently of the ground on the terminal 217, and in attracting its left armature, connects the busy-back apparatus 225 to the calling line.

When the calling party replaces his receiver, slow relay 101 becomes deënergized, as hereinbefore described, causing the escape magnet 108 to become permanently deënergized and close the circuit of release magnet RM sufficiently long to release the first selector. The deënergization of relay 101 also opens the circuit of release relay RR of the connector, which restores the connector brush shaft and side switch, as hereinbefore pointed out. As side-switch arm 224 moves back to its normal position, it opens the locking circuit of the busy relay BR.

What is claimed is:

1. In a telephone exchange system, the combination with telephone lines, senders associated therewith, a selector adapted to be set thereby, means for associating said selector with said lines, a side switch for said selector including an escape magnet, a slowly operating release magnet for said selector, a circuit therefor including a contact of said escape magnet, means for operating said escape magnet to cause the side switch to effect the changeover operations during the setting of said selector, and means for preventing said escape magnet from maintaining said release circuit closed long enough to cause the energization of the release magnet, during the changeover operations.

2. In a telephone exchange system, the combination with telephone lines, senders associated therewith, a selector adapted to be set thereby, means for associating said selector with said lines, a side switch for said selector including an escape magnet, a slowly operating release magnet for said selector, a circuit therefor including a back contact of said escape magnet, means for operating said escape magnet to cause the side switch to effect the changeover operations during the setting of said selector, and means for preventing said escape magnet from remaining deënergized during the changeover operations long enough to cause the energization of the release magnet.

3. In a telephone exchange system, the combination with telephone lines, senders associated therewith, a selector adapted to be set thereby, a side switch therefor including an escape magnet, means for associating said selector with said lines, a slowly operating release magnet for said selector, a circuit therefor including a back contact of said escape magnet, a circuit closed while a sender is operating and adapted to energize said escape magnet, said magnet, upon the restoration of the sender, being deënergized to advance the side switch, a circuit for reenergizing said escape magnet when the side switch reaches the next position, a test circuit including said escape magnet and busy trunks, said circuit being opened when an idle trunk is reached to deënergize the escape magnet to advance the side switch, a circuit for reënergizing said magnet when the side switch reaches the next position, said circuit being controlled by the calling line.

4. The combination with telephone lines and a selector therefor provided with a slowly acting release magnet and with a side switch having an operating magnet for controlling the changeover operations, of a circuit for the release magnet including a contact of the side-switch magnet, and means for preventing said side-switch magnet from maintaining the release circuit closed during the changeover operations long enough to cause the energization of the release magnet.

In witness whereof, I hereunto subscribe my name this 8th day of September A. D., 1916.

SAMUEL B. WILLIAMS, Jr.

Copies of this patent may be obtained for five cents each, by addressing the "Commissioner of Patents, Washington, D. C."